US008948127B2

(12) United States Patent
Keller et al.

(10) Patent No.: US 8,948,127 B2
(45) Date of Patent: Feb. 3, 2015

(54) METHOD, APPARATUS AND COMPUTER PROGRAM FOR SUPPORTING A SESSION IDENTIFIER IN CASE OF A TRANSFER BETWEEN DIFFERENT RADIO ACCESS NETWORKS

(75) Inventors: Ralf Keller, Würselen (DE); Karl-Peter Ranke, Herzogenrath (DE); Anders Nohlgren, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 245 days.

(21) Appl. No.: 12/989,085

(22) PCT Filed: Apr. 24, 2009

(86) PCT No.: PCT/EP2009/003014
§ 371 (c)(1),
(2), (4) Date: Oct. 22, 2010

(87) PCT Pub. No.: WO2009/130042
PCT Pub. Date: Oct. 29, 2009

(65) Prior Publication Data
US 2011/0058520 A1  Mar. 10, 2011

Related U.S. Application Data

(60) Provisional application No. 61/074,571, filed on Apr. 24, 2008.

(51) Int. Cl.
*H04W 4/00* (2009.01)
*H04W 76/02* (2009.01)
(Continued)

(52) U.S. Cl.
CPC ......... *H04W 76/021* (2013.01); *H04L 65/1016* (2013.01); *H04W 65/1083* (2013.01); *H04W 36/0033* (2013.01); *H04W 80/10* (2013.01)
USPC ............ 370/331; 370/338; 370/340; 370/343

(58) Field of Classification Search
CPC .................................................. H04W 76/021
USPC ........... 370/328, 331, 352, 354, 401; 709/227
See application file for complete search history.

(56) References Cited

U.S. PATENT DOCUMENTS 7,031,280 B2 * 4/2006 Segal ............................ 370/331
7,822,858 B2 * 10/2010 Kumarasamy et al. ....... 709/227
(Continued)

OTHER PUBLICATIONS

3GPP: "3rd Generation Partnership Project; Technical Specification Group Services and System Aspects; Single Radio Voice Call Continuity (SRVCC); Stage 2 (Release 8)" 3GPP Standard; 3GPP TS 23.216, 3rd Generation Partnership Project (3GPP), Mobile Competence Centre, 650, Route Des Lucioles, F-06921 Sophia-Antipolis Cedex, France, No. V1.1.0, Apr. 1, 2008, XP050363160.
(Continued)

*Primary Examiner* — Brian D Nguyen
*Assistant Examiner* — Toan Nguyen

(57) ABSTRACT

A method and application server for supporting a communication established between a first mobile terminal towards a telecommunications network that includes first and second radio access networks. When a session setup is initiated with respect to the first mobile terminal, the application server receives a session identifier. The application server enters the identifier into an identifier list comprising one or more identifiers for identifying sessions with respect to the first mobile terminal. If the application server receives an indication of a session transfer from the first radio access network to the second radio access network, the application server provides the identifier list to the second radio access network in response to the indication.

10 Claims, 5 Drawing Sheets

(51) Int. Cl.
*H04L 29/06* (2006.01)
*H04W 36/00* (2009.01)
*H04W 80/10* (2009.01)

(56) References Cited

U.S. PATENT DOCUMENTS

| | | | |
|---|---|---|---|
| 2002/0080822 A1 | 6/2002 | Brown et al. | |
| 2007/0153769 A1* | 7/2007 | Comstock et al. | 370/352 |
| 2007/0211694 A1* | 9/2007 | Rasanen | 370/352 |
| 2008/0267128 A1* | 10/2008 | Bennett et al. | 370/331 |
| 2009/0034472 A1* | 2/2009 | Purnadi et al. | 370/331 |
| 2009/0052460 A1* | 2/2009 | Coulas et al. | 370/401 |
| 2009/0080382 A1* | 3/2009 | Chen et al. | 370/331 |

OTHER PUBLICATIONS

3GPP: "3rd Generation Partnership Project; Technical Specification Group Core Network; Mobile radio interface signaling layer 3; General aspects (Release 7)" 3GPP Standard; 3GPP TS 24.007, 3$^{rd}$ Generation Partnership Project (3GPP), Mobile Competence Centre; 650, Route Des Lucioles; F-06921 Sophia-Antipolis Cedex; France, No. V7.0.0, Sep. 1, 2005, XP050364366.

Ericsson: "Transaction Identifier for SRVCC" 3GPP Draft: S2-083502_S2_65_SRVCC TI R5, 3rd Generation Partnership Project (3GPP), Mobile Competence Centre; 650, Route Des Lucioles; F-06921 Sophia-Antipolis Cedex France, vol. SA WG2, No. Prague; Apr. 30, 2008, XP050265712.

3GPP. 3$^{rd}$ Generation Partnership Project; Technical Specification Group Services and System Aspects; IP Multimedia Subsystem (IMS) Centralized Services; Stage 2 (Release 8). 3GPP TS 23 292 v8.3.0 (Mar. 2009).

3GPP, 3$^{rd}$ Generation Partnership Project: Technical Specification Group Services and System Aspects; IP Multimedia Subsystem (IMS) Service Continuity: Stage 2 (Release 8). 3GPP TS 23.237 v8 3.0 (Mar. 2009).

* cited by examiner

METHOD, APPARATUS AND COMPUTER PROGRAM FOR SUPPORTING A SESSION IDENTIFIER IN CASE OF A TRANSFER BETWEEN DIFFERENT RADIO ACCESS NETWORKS

This application claims the benefit of U.S. Provisional Application No. 61/047,571, filed Apr. 24, 2008, the disclosure of which is fully incorporated herein by reference.

TECHNICAL FIELD

The present invention relates to interworking between different radio access networks within a mobile communications network.

BACKGROUND

Mobile communications networks are currently evolving from circuit switched (CS) networks towards packet switched (PS) networks, and by that integrate into Internet Protocol (IP) based infrastructures that are e.g. used for the Internet and the World Wide Web respectively.

So-called IP Multimedia Subsystem (IMS) networks have been developed for delivering multimedia services to mobile terminals (e.g. to GSM terminals being designed according to the well-known standard named Global System for Mobile Communications (GSM), or to Wideband Code Division Multiplex Access (WCDMA) stations. Hereto, calls from and to subscribers of the multimedia services using a circuit switched based access, in the following also being referred to as CS access, e.g. (e.g. WCDMA/GERAN) are routed through the IMS network in order to reach an IMS service engine. This concept is called IMS Centralized Services (ICS), e.g. being described the standardization document TS 23.292, (current release 9.1), established by the so-called Third Generation Partnership Project (3GPP) that is a standardization body to define globally applicable technical specifications.

A further 3GPP standard document in this scope is TS 23.237 (current release 9.0) specifying architectural requirements and procedures for delivery of PS-CS or CS-PS IMS Service Continuity.

In the frame of the 3GPP, further a project called Long Term Evolution (LTE) has been established to enhance the UMTS mobile phone standard to cope with future requirements. Within this project, the packet core is being developed to the so-called Evolved Packet Core (EPC) forming a part of the Evolved Packet System (EPS) that supports the so-called evolved UMTS Terrestrial Radio Access Network (eU-TRAN) being a new packet oriented radio access (PS access network).

As part of the 3GPP standardization, e.g. being described in the document TS 23.216, (current release 8.3), work on call continuity for terminals equipped with single radio means (i.e. terminals with one single radio transmitter and one single radio receiver thus being capable of transmitting/receiving on only one of PS- or CS-access at a given time) being referred to as single radio voice call continuity (SR-VCC) is ongoing, enabling to transfer an IMS voice call from the EPS to the CS and vice versa.

According methods described in the above-cited document TS 23.216, single radio voice call continuity between PS access and CS access is based on the principle that an MSC Server being enhanced for SRVCC, also being referred to as evolved MSC server (eMSC), initiates a session transfer towards an application server being dedicated to maintain service continuity when handing over from an actual access network to a target access network, also being referred to as Service Centralization and Continuity Application Server (SCC-AS). Such handover might be initiated when the relocation request for the speech bearer is received from a mobility management entity (MME) that manages the mobility with respect to the mobile terminal. The target access network (e.g. the radio network controller RNC within the PS access network or the base station controller BSC within the CS access network) eventually executes the handover.

IMS Service Continuity is a solution that assumes an IMS service engine, so when the mobile terminal is attached via PS access, the respective call state is handled both in the mobile terminal and in the IMS. The CS access (i.e. CS radio and CS call control) serves merely as a vehicle to get to IMS (session control and services). An MSC server enhanced for ICS is acting as mobile terminal and may hence keep the call state as well.

According to methods described in the above-cited document TS 23.237 active/hold session are to be transferred individually between a so-called source access (transferring-out) leg and a target access leg (transferring-in) leg. Each session requires an own session transfer number or identifier. According to methods described in the above-cited document TS 23.216, the MSC server establishes a call towards the IMS based on a relocation request send by the mobility management entity (MME). The call is then handed over from PS to CS.

According to the existing 3GPP procedures, no information regarding any transaction is exchanged between the mobile terminal and the MSC; in other words, after handover the mobile terminal and the MSC server do not share sufficient transaction information. Thus a certain call cannot be referenced by any of both entities. As a consequence, only one active call can be transferred; any further call (e.g. held or waiting call) will be lost.

SUMMARY

It is an object of the present invention to improve a transfer between different (CS and PS) access networks. This object is achieved by the independent claims. Advantageous embodiments are described in the dependent claims.

It is assumed that an initial session related to a mobile terminal (or user equipment—UE—), before any session transfer is invoked, is routed towards a dedicated application server within a communications network that associates an access leg with a remote leg at the initial session establishment, wherein such call leg association is also being referred to as anchoring the session. The dedicated application server is further dedicated to service continuity handling as described in the introductory part, and is thus also being referred to as Service Centralization and Continuity application server—SCC-AS—by 3GPP.

According to embodiments of the invention, a communication session is established between a first mobile terminal towards an application server within a telecommunications network. The telecommunications network further comprises a first radio access network—RAN—and a second radio access network facilitating each a wireless communication between the terminal and the communications network. The RANs can be regarded as a parts of the communications network that provides a radio access to the mobile terminal. Usually, each RAN comprises one or a plurality of control nodes and transceiver stations. These stations each serve mobile terminals within a certain region. By way of example, the first RAN provides to the mobile terminal a packet switched communication channel, in the following also being referred to as PS RAN (e.g. eUTRAN), and the second RAN provides a circuit switched communication channel, in the following also being referred to as CS RAN (e.g. GERAN or UTRAN in combination with the A/IuCS interface to the MSC). In order to provide a communication between the network and the mobile terminal, a communication session is established via one of both radio access networks. At session setup, the application server receives an identifier identifying the session (e.g. a transaction identifier TI), and stores the identifier e.g. by entering this identifier into an identifier list comprising a plurality of identifiers for all active and held sessions related to the terminal, (e.g. comprising the involved parties (A party, B party, . . . ) transaction identifier (TI), TI flag, and further session information.

If e.g. due to a movement of the mobile terminal out of the range of the first RAN a transfer or handover from one of the RANs to the other one of the RANs is to be performed, the application server receives an indication of this transfer, and provides all identifier information related to the mobile terminal, in the following also being referred to as identifier list, to one or a plurality of dedicated nodes of the telecommunications network, so that such node is able to share all session information with the mobile terminal.

In an embodiment, the application server is adapted to anchor session versus the first terminal by establishing a initial access leg (transferring-out leg) to communicate with the first terminal over one of the first or the second radio access network and a successive access leg (transferring-in leg) over the other radio access network, wherein the identifier is received via the transferring-out leg before the session transfer, and the identifier list is sent via the transferring-in leg after the session transfer.

In an embodiment, the application server is a Service Centralization and Continuity Application Server as described in the introduction. Alternatively, the application server is an application server behind the Service Centralization and Continuity Application Server with respect to the mobile terminal (connected over a so-called remote access leg).

In an embodiment, a handover from the first RAN (PS RAN) to the second RAN (CS RAN) is to be carried out. In this case, a switching server (MSC Server or eMSC) is on the transferring-in leg. The identifier list is thus provided from the application server to the switching server in response to the transfer indication. Therewith, the switching server holds a list of active calls and hold calls per subscriber to be able to establish session for hold calls towards the service continuity server.

In an embodiment, a transaction identifier (TI) as defined in 3GPP TS 24.008 (current release 8.5) is used as identifier shared by the mobile terminal and the switching Server e.g. when using TS 24.008 based signaling over the CS radio access network.

In an embodiment, in case of a call originated by the mobile terminal, the TI is allocated by the mobile terminal, and in case of a terminated call, the TI is allocated by the network, e.g. by the application server or by a switching node (e.g. the visited MSC).

According to 3GPP specifications, voice call continuity (SRVCC) while performing a handover between the PS based RAN (E-UTRAN) and the CS based RAN (GERAN/UTRAN) as e.g. described in 3GPP TS 23.216 is based on the principle that an MSC Server initiates the session transfer towards a SCC-AS, when a relocation request for the speech bearer is received from the MME, while the target RNC/BSC will executing the CS handover.

According to the invention it is now possible to ensure that both the terminal and the switching Server share session state information both prior and after handover, although neither the terminal nor the MSC Server has allocated a Transaction Identifier as specified in TS 24.008 (note that according to 3GPP TS 24.008 the terminal might started the call as an IMS session while being in E-UTRAN; the MSC Server however only allocates a TI for a terminating session).

The present invention also concerns computer programs comprising portions of software codes in order to implement the method as described above when operated by a respective processing unit of a user device and a recipient device. The computer program can be stored on a computer readable medium. The computer-readable medium can be a permanent or rewritable memory within the user device or the recipient device or located externally. The respective computer program can be also transferred to the user device or recipient device for example via a cable or a wireless link as a sequence of signals.

In the following, detailed embodiments of the present invention shall be described in order to give the skilled person a full and complete understanding. However, these embodiments are illustrative and not intended to be limiting.

DETAILED DESCRIPTION

Figure 1:
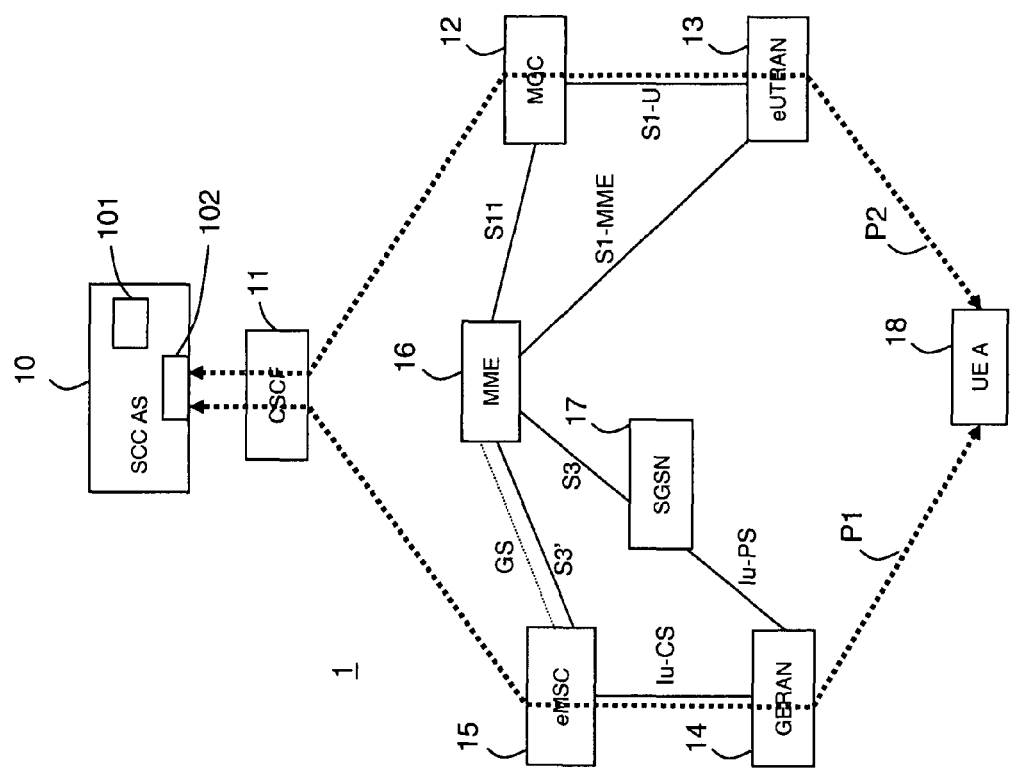
FIG. 1 shows a block diagram of an exemplary telecommunications network comprising an application server according to the invention.

FIG. 1 shows a block diagram of a telecommunications network 1 and by way of example a first user terminal or user equipment—UE-A—18. By way of example, the telecommunications network 1 comprises an application server adapted for service centralization and continuity also being referred to as service centralization and continuity application server (SCC-AS) 10, a Call Session Control Function (CSCF) node 11 providing session control for terminals accessing services within the IMS, a gateway node (SGW/PDNGW) 12, a first radio access network 13, by way of example the above-mentioned evolved UTRAN, a second radio access network 14, by way of example the above mentioned GERAN/UTRAN, a switching server 15, in the following also being referred to as an evolved MSC (eMSC), a mobility managing entity (MME) 16, and a so-called serving GPRS Support Node (SGSN) 17. By way of example, the service centralization and continuity application server (SCC-AS) 10 is shown comprising a memory for storing session information with respect to served subscribes (first terminal 18) and a sender/receiver unit 102 for sending and receiving information to/from the communications network 1.

Further, FIG. 1 shows exemplary interfaces or so-called reference points between exemplary above-mentioned devices:

S1-MME: Reference point for the control plane protocol between E-UTRAN and the MME. (As protocol over this reference point the so-called eRANAP can be employed using Stream Control Transmission Protocol (SCTP) as the transport protocol S1-U: Reference point between E-UTRAN and Serving GW 12 for the per bearer user plane tunneling and inter eNodeB path switching during handover. (As transport protocol, GPRS Tunneling Protocol-User plane (GTP-U) can be employed);

S3: This reference point between the SGSN 17 and the MME 16 enables user/bearer information exchange for inter 3GPP access network mobility in idle and/or active state;

S11: This reference point between the MME 16 and the Serving GW 12

IuCS: this interface interconnects the switching server 15 (MSC/VLR) and RNC network nodes of the CS-RAN 14;

IuPS: this interface provides interconnection between the SGSN 17 and the RNC network nodes of the CS-RAN 14 in UMTS/3G networks;

GS and S3': these interfaces provide interconnections between the MME 16 and the switching server 15.

The service centralization and continuity application server 10, in the following being referred to as service continuity server 10, is a call control server (e.g. communicating by means of the SIP protocol) controlling a communication towards the first mobile terminal 18, e.g. a communication between the first mobile terminal 18 to one or a plurality of further mobile terminals (not shown here). It the example shown here, the service continuity server this 11, together with the CSCF 11, forms a part of a (Core) Packet Data System, e.g. an IP multimedia system IMS. As other application servers, the service continuity server 10 might communicate over a standard ISC interface (reference point). The service continuity server 10 (or more specifically the so-called Domain Transfer Function DTF associated to that server) is responsible for anchoring the sessions and executing the session transfer between different access networks with respect to the first mobile terminal 18. Therein, the service continuity server 10 associates a call control leg established between the service continuity server to the first mobile terminal 18, in the following also being referred to as access leg, with a further call control leg between the service continuity server and any further communication party (e.g. a remote mobile terminal or any application server), in the following also being referred to as remote leg. In cases of a domain transfer request, the service continuity server 10 establishes a corresponding new access leg to the first mobile terminal 18, removes the initial access leg, and updates the remote leg. For a PS-CS domain transfer, the initial access leg can be regarded as PS leg, and the new access leg can be regarded as CS leg. The new access leg is also being referred to as transferring-in leg, while the initial access call leg is being referred to as transferring-out leg.

The access call leg might be formed with a combination of a Service Control Signalling Path and a CS Bearer Control Signalling Path. The remote call leg (presented by the service continuity server 10 to the CSCF 11 as an IMS session) might be formed using IMS SIP signalling on behalf of the first mobile terminal 18.

When anchoring the session, the SCC-AS 10 might allocate a session transfer identifier (STI) when needed at initial session establishment, wherein the STI is an identifier used by the first mobile terminal to request the SCC-AS 10 to perform a Session Transfer of the media path, which allows the SCC-AS 10 to correlate the different call legs. The UE might use a Session Transfer Number (STN) that might be a so-called E.164 number to request the SCC-AS 10 to perform the session transfer of the media path from PS to CS access and vice versa.

The Call Session Control Function (CSCF) node 11 provides session control for terminals accessing services within the IMS and provides service to them (even though these services may be on separate application platforms). It may perform routing and translation, maintaining session timers, retrieving authorization, service triggering information and user profile.

The gateway node 12 is a network element that combines by way of example several gateway functions, e.g. a Serving Gateway and a PDN (packet data network) Gateway as e.g. described in 3GPP TS 23.401, wherein the Serving Gateway terminates the interface towards E-UTRAN, and the PDN Gateway terminates the interface (SGi) towards a packet data network PDN. Therein, the packet data network may be any operator external public or private packet data network or an intra operator packet data network. In the context of this application, thus the gateway node 12 terminates the interface to the first radio access network 13 and further terminates the interface to the network for provision of IMS services. The PDN GW and the Serving GW may be implemented in one physical node or in separated physical nodes.

The radio access networks 13 and 14 each allows the first mobile terminal (UE-A) 18 to get connected to the IMS network, of which the CSCF 11 and the SCC-AS 10 are exemplary parts of. Each of the radio access networks 13 and 14 might comprise one or a plurality of control nodes (e.g. being referred to as radio network controllers in the terminology of UMTS, base station controllers in the terminology of GSM) and transceivers (e.g. being referred to as base transceiver station in the terminology of GSM, NodeB in the terminology of UMTS and an evolved NodeB or eNodeB in the terminology of LTE) for providing a physical radio connection to the first mobile terminal 18. As discussed above, radio access networks might be characterized as based on circuit switched principles (e.g. GERAN), and/or on packet switched principles (e.g. eUTRAN). It is to be noted that access networks might provide both circuit switched connections and packet switched connections e.g. for both voice connections and packet connections respectively as exemplarily shown here for the second radio access network 14 (GERAN/UTRAN as shown in FIG. 1), while the first radio access network 13 is exemplarily shown as packet oriented radio access network (eUTRAN as shown in FIG. 1). In the following, the second RAN 14 will only be regarded with respect to its circuit switched CS capabilities and may thus be regarded as CS RAN, while the first RAN 13 will be regarded as packed switched (PS) RAN.

The switching node 15 is a network element (e.g. an MSC Server or an MSC) handling call control and signalling, optionally being enhanced for IMS centralized services (also being referred to as eMSC). The switching node 15 mainly comprises the call control and mobility control parts of a GSM/UMTS. It might be integrated together with a visiting location register (VLR) to hold the mobile subscriber's service data. The switching node 15 terminates the user-network signalling and translates it into the signalling towards the network.

The mobility management entity MME 16 is a signalling-only entity. Its main function is to manage the mobility of the mobile terminal 18, with respect to the first radio access network 13. It supports means of personal, service and terminal mobility, i.e., it allows users to access network services anywhere, as well as to continue their ongoing communication and to access network services anywhere using one's own mobile terminal. It further supports global roaming, i.e. it should remain independent of the underlying wireless technology. In addition, the MME might also perform authentication and authorization, idle-mode tracking and reachability, security negotiations, and so-called NAS (non access stratum) signalling. It is involved in the bearer activation/deactivation process and is also responsible for choosing the SGW for a mobile terminal at the initial attach and at time of intra-LTE handover involving Core Network node relocation.

The Support Node SGSN 17 is responsible for the delivery of data packets from and to the first mobile terminal 18 within its geographical service area with respect to the packet switched radio access network PS RAN 13. Its tasks include packet routing and transfer, mobility management (attach/detach and location management), logical link management, and authentication and charging functions. The location register of the SGSN 17 e.g. stores location information (e.g., current cell, current VLR) and user profiles (e.g., IMSI, address(es) used in the packet data network) of all GPRS users registered with the SGSN.

In the following, it will assumed that the first mobile terminal 18 supports both access to the CS domain of the communications network over the first RAN 13 (eUTRAN) and over the second RAN 14 (GERAN/UTRAN), to the corresponding Packet System. It will be further assumed without limiting to the scope of the invention that the mobile terminal is a so-called single-radio terminal; i.e. a terminal that has one set of transmitter/receiver means to communicate with just one of the first RAN 13 and the second RAN 14 at a given time (it is a matter of course that the invention also works for multi radio terminals). It will further be assumed that the first mobile terminal 18 is a so-called SRVCC capable terminal that, if engaged in a voice call, determines that it is moving away from PS RAN coverage, it notifies the network to perform a handover to the (legacy) CS RAN.

The mobile first mobile terminal 18 might communicate either via a first communication path P1 over the first RAN 13 or via a second communication path P2 over the second RAN 14, e.g. depending on its current location, the availability and physical reachability of transceivers of the radio access networks. The first RAN 13 and the second RAN 14 might overlap e.g. in certain areas. In such areas, the first mobile terminal 18 might choose one of both access networks to access the core network. While it might be preferred to be connected via the first RAN 13 (that might e.g. provide more bandwidth compared to the other RAN 14), a coverage of this RAN might be more limited than a coverage of the second RAN (in case of GERAN, a more or less complete coverage is achieved in a plurality of countries). If the mobile terminal is moving out of the range of the first RAN 13, a handover to the second RAN 14 is required to maintain a connection to the network. In such situation it is desired that any services provided to the first mobile terminal 18 are seamless maintained, regardless of the access network transfer.

In the following, an exemplary scenario will be described, wherein the (first) mobile terminal or party 18 (UE-A) has an active call with a second mobile terminal or party (UE-B), and a call on hold with a third mobile terminal or party (UE-C).

According to embodiments of the invention, the following exemplary preconditions or actions might be performed or set prior to a session transfer:

The service continuity server 10 (or any other application server behind the mobility anchor) maintains a list of active and held sessions.

For each mobile originating call the first mobile terminal 18 allocates a transaction identifier (TI), either in CS access (e.g. as defined in 3GPP TS 24.008) or in PS access, and provides this TI to the service continuity server SCC-AS at call establishment. In case of CS access, the MSC Server 15 provides this TI to the service continuity server 10. The service continuity server 10 stores the TI and the information that the TI was allocated by the mobile terminal 18 in the above-mentioned list e.g. together with state information for this session—TI flag—(e.g. a information whether the call is active or on-hold). This information may be used to identify the call e.g. when using the so-called DTAP (Direct Transfer Application sub-Part) signaling (e.g. being described in 3GPP TS 24.008) between MSC server and first mobile terminal 18.

For each mobile terminating call in CS access the visited MSC allocates a TI and sends it to the mobile terminal 18 (e.g. as defined in 3GPP TS 24.008). The MSC server 15 provides this TI to the service continuity server 10 at session establishment towards the service continuity server 10. The service continuity server 10 stores the TI and the information that the TI was allocated by the network in above mentioned list together with other information for this call. This TI will be used to identify the call in case later there is a handover back to CS access. Optionally this TI can be allocated by the service continuity server 10 and send to the MSC Server 15, which may in turn send it to the mobile terminal 18.

For each mobile terminating call in PS access the service continuity server SCC-AS allocates a TI, and provides this TI to the mobile terminal UE at call establishment. The service continuity server 10 stores the TI and the information that the TI was allocated by the network in above mentioned list together with other information for this call. This TI will be used to identify the call e.g. when using DTAP signaling between MSC server 15 and first mobile terminal 18.

During a session transfer, certain actions might be performed. In the following exemplary actions during the session transfer are described:

An active session is transferred using a Session Transfer Number (e.g. STI or STN);

The service continuity server 10 looks up an active call in a list (e.g. stored within the server or within any data base accessible by the server) for the transferring party;

The service continuity server 10 sends (on a transferring-in leg) the table entry which might include session information, session state (e.g. active, hold), stored SDP parameters, TI and TI flag;

In case of a handover from PS to CS (the MSC Server 15 being on transferring-in leg) the following steps are performed:

The mobile terminal 18 updates its own (CS-) stack on hold calls

The mobile terminal may optionally synchronize with information (e.g. received via I1/Gm);

The MSC server 15 maintains a list of active and hold calls per subscriber; and The MSC server 15 establishes session for hold calls towards the service continuity server 10.

Otherwise, in case of handover from CS to PS, the following steps are performed:

The first mobile terminal 18 updates its own (SIP) stack on active/held calls with the protocol (SIP/SDP) details (The mobile terminal 18 should have full control of what sessions is has ongoing and possibly know the STI. Thus it may use VDI to request the transfer the active call and then handle the STI for the call on hold in the same manner), and The first mobile terminal 18 establishes a session for hold calls towards the service continuity server 10.

After the session transfer, further certain actions might be performed. In the following exemplary actions after the session transfer are described.

It is in principle possible to have in total a plurality of active and/or held sessions in IMS. An operator may set limit for the number of active and on hold calls, e.g. such that only one call can be active and only a certain number (e.g. one) call can be on hold.

According to the present release of TS 24.008, only one active and one held session is supported. Therefore, within the scope of this release, it is recommended to limit the SRVCC to one active and one held session.

In the following, examples for handling of other cases (that are e.g. possible in IMS) are described:

Two calls active on PS: Depending on operator policies and/or by user preference, it may be decided, which one of the calls is to be kept active and which one is to be put on hold.

More than one call on hold on PS: Depending on operator policies and/or by user preference, it may be decided, which call is to be kept and which one is to be put on drop (e.g. keeping the call which was put last on hold).

According to further embodiments, an involved dropped party may be informed about the reason for dropping.

Figure 1A:
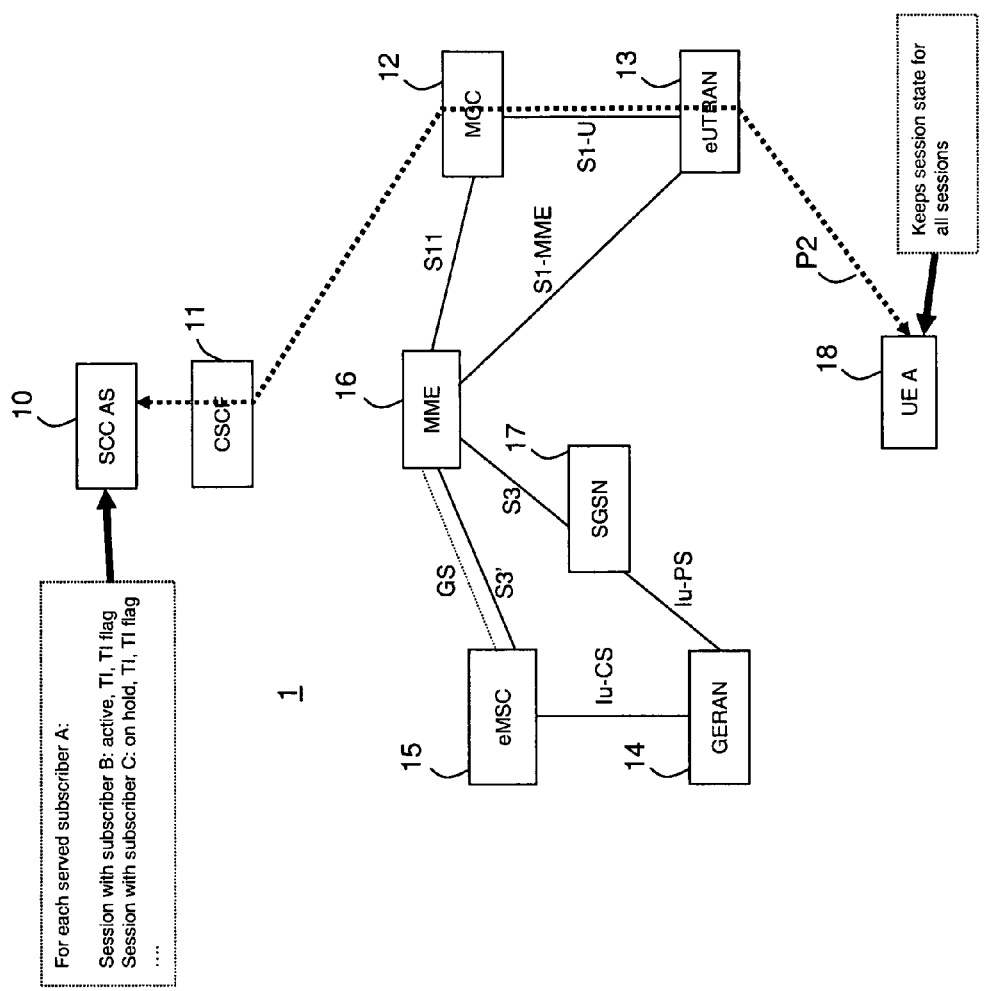
FIG. 1a shows the block diagram of FIG. 1 prior to a session transfer.

FIG. 1a shows the block diagram of FIG. 1, prior to a session transfer from PS to CS. The mobile terminal 18 has stored a session state for all its sessions, and the service continuity server 10 has stored such information for each served subscriber, e.g. and active session with a second mobile terminal and the corresponding TI and TI flag and a session on hold with a third mobile terminal also together with the corresponding TI and TI flag.

Figure 1B:
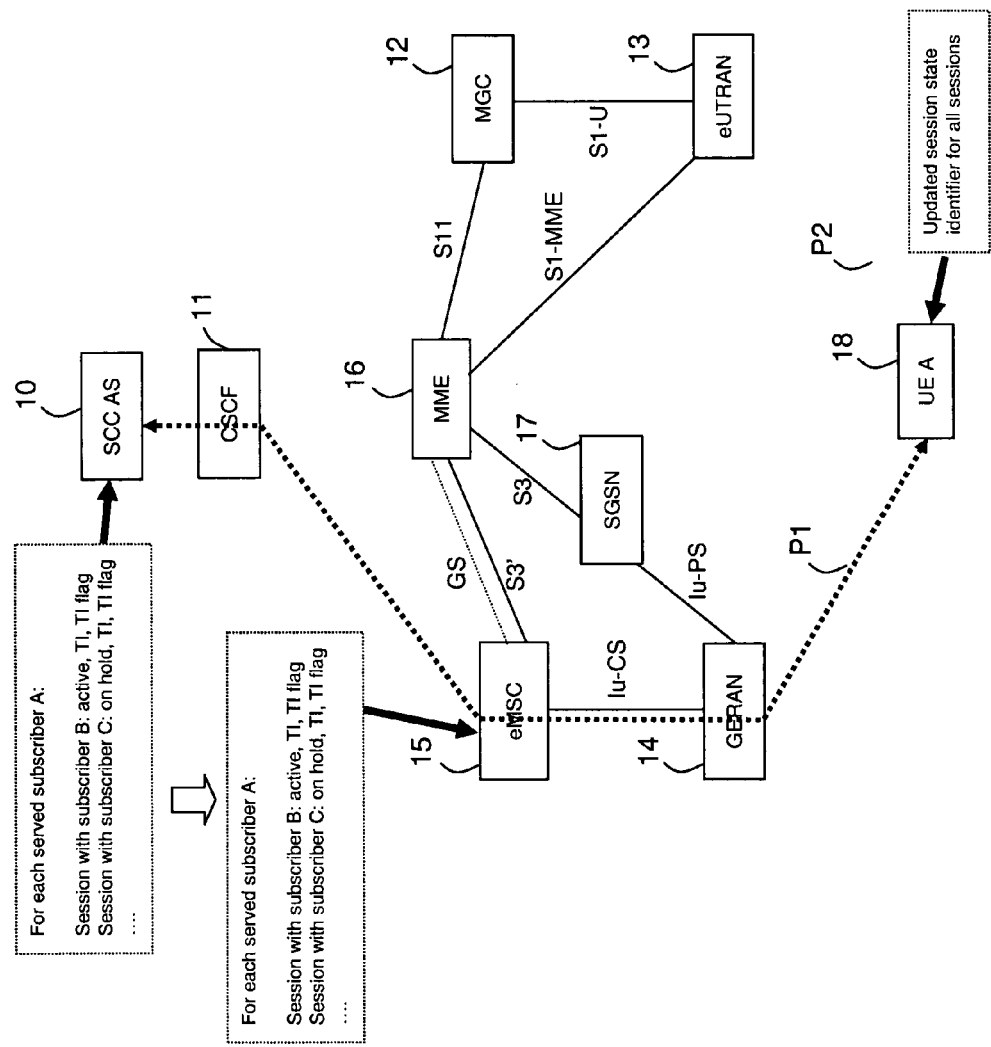
FIG. 1b shows the block diagram of FIG. 1 after the session transfer.

FIG. 1b shows the block diagram of FIG. 1 after the session transfer. The mobile terminal 18 has stored updated session state information for all its sessions, and the service continuity server 10 has stored the corresponding information as shown in FIG. 1a. This information is transferred (over the transferring-in leg) to the switching server 15, so that both the switching server 15 and the mobile terminal share the same state information.

Figure 2:
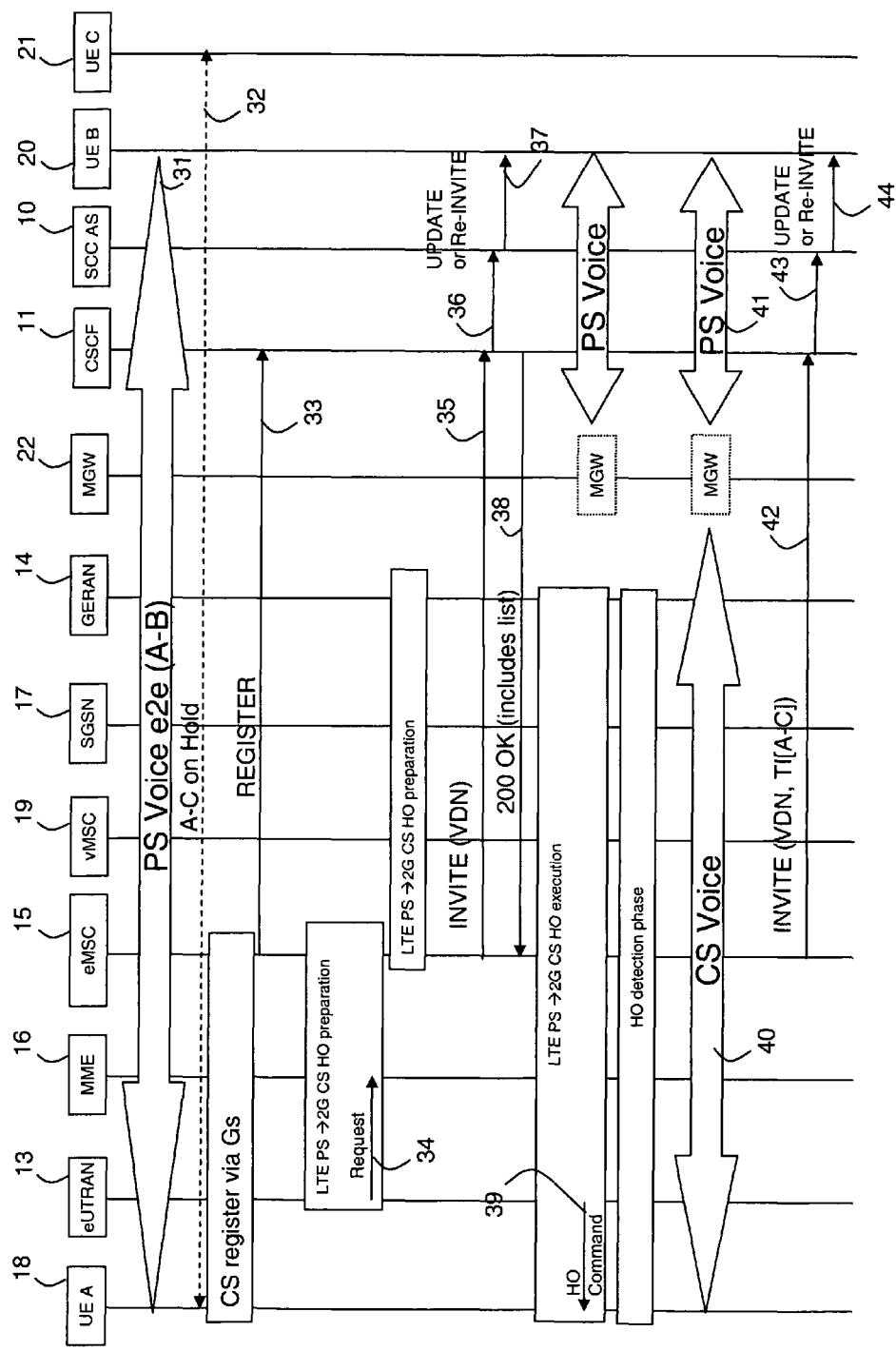
FIG. 2 shows an exemplary sequence diagram of a radio access handover.

FIG. 2 shows an exemplary sequence diagram of a radio access handover within a communications network as shown in principal in FIG. 1.

It will be assumed that initially, an active packet switched voice session 31 takes place between the first mobile terminal 18 and a second mobile terminal 20. By way of example, further there is an on-hold session 32 between the first mobile terminal 18 and a third mobile terminal 21.

A handover from the source RAN 13 to the target RAN 14 is triggered (e.g. based on UE measurement reports). Within this procedure, a register message 33 is transmitted from the switching server 15 to the CSCF 11.

In the context of a handover preparation between the source RAN 13, the MME 16, and the switching Server 15, the source RAN 13 sends a handover request 34 message to the MME 16.

After handover preparation between the switching Server 15, a visited MSC 19 and the target RAN 14, the switching Server 15 initiates the session transfer by sending an INVITE message 35 using the VDN towards the CSCF that forwards this message 36 to the service continuity server 10.

The service continuity server 10 sends a corresponding update or re-invite message 37 to the second mobile terminal 20.

During the execution of the Session Transfer procedure the remote end is updated with the SDP of the CS access leg. The downlink flow is switched towards the CS access leg at this point.

The CSCF 11 sends a 200 OK 38 back to the switching server 15, including the list of Transaction Identifiers being stored in the service continuity server 10.

In the context of handover execution carried out between the source RAN 13, the target RAN 14, the MME 16 and the switching server 15 the source RAN 13 sends a Handover Command message 38 to the first mobile terminal 18.

After Handover Detection, a completion of the establishment of a new communication session comprised by a circuit connection CS Voice 40 between the first mobile terminal 18 and a media gate way 22 associated to the switching server 15 and PS Voice connection 41 between the media gate way 22 and the second mobile terminal 20 is performed.

The switching server 15 sends an INVITE message 42 (comprising VDN and transaction identifiers to the CSCF 11, that forwards this message 43 to the service continuity server 10.

The service continuity server 10 sends a corresponding update or re-invite message 44 to the second mobile terminal 20.

Figure 3:
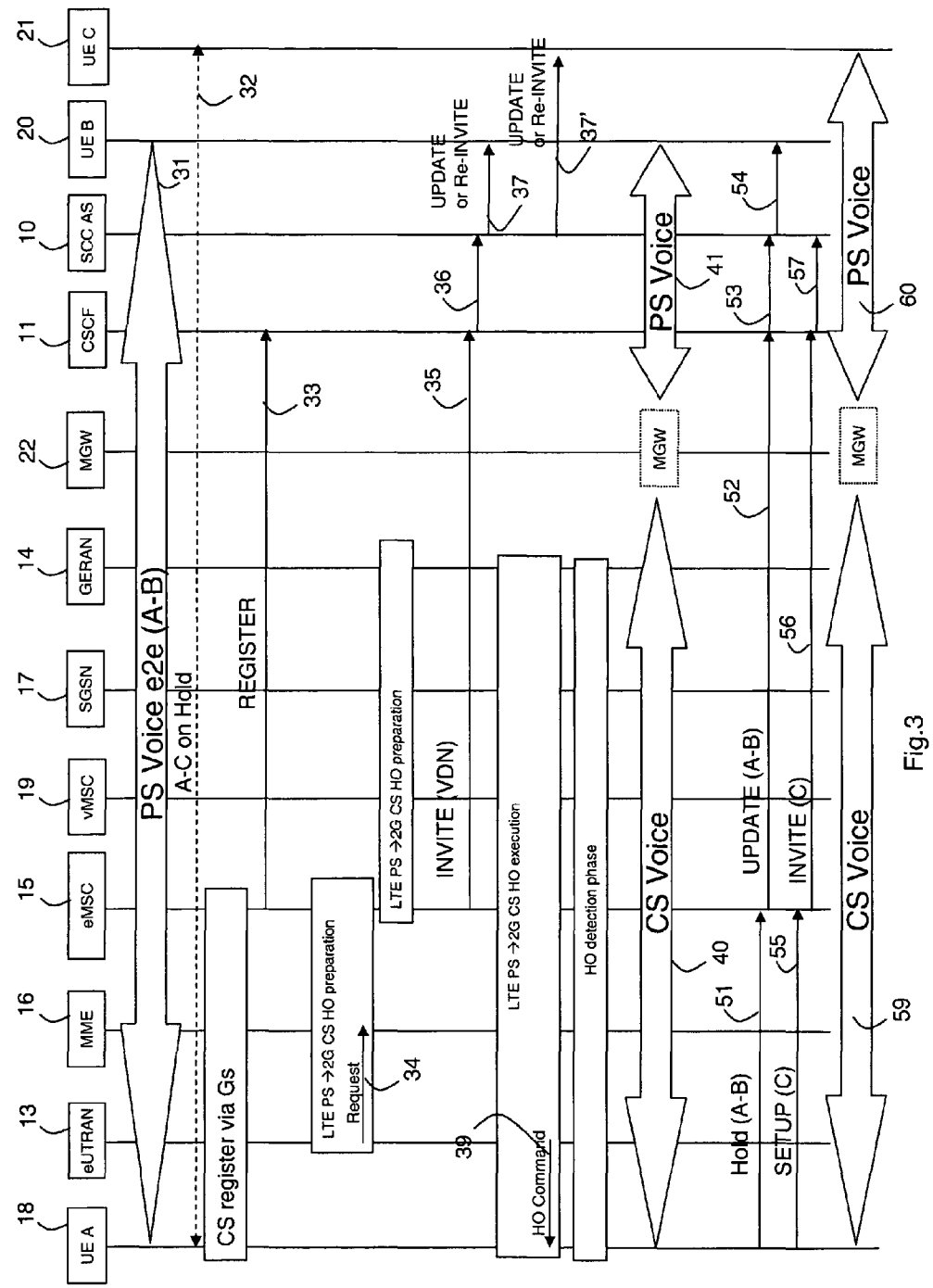
FIG. 3 shows an alternative exemplary sequence diagram.

FIG. 3 shows an alternative exemplary sequence diagram, wherein the session between the first mobile terminal 18 and the second mobile terminal 20 is put on hold and the session between the first mobile terminal 18 and the third mobile terminal is activated. Thereto the messages or flows 31-41 are similar to the flows and messages shown in FIG. 2. However, the messages 42, 43 and 44 are replaced by messages/flows 51-60.

It is assumed that the user wants to resume the on-hold session between the first mobile terminal 18 and the third mobile terminal 21. Thereto the following steps are exemplarily performed:

The first mobile terminal 18 sends an on hold message 51 to put the session to the second mobile terminal on hold to the switching server 15.

The switching server 15 sends corresponding session update information 52 to the CSCF that forwards this message 53 to the service continuity server 10. The service continuity server 10 sends corresponding information 54 to the second mobile terminal 54.

The first mobile terminal 18 sends SETUP request message 55 to resume the session towards the thirds mobile terminal 21 to the switching server 15.

In response to receiving this message, the switching server 15 sends a corresponding INVITE message 56 to the CSCF 11 that forwards this message 57 to the service continuity server 10.

A completion of the establishment of a further new communication session comprised by the circuit connection CS Voice 40 between the first mobile terminal 18 and a media gate way 22 associated to the switching server 15 and a further PS Voice connection 59 between the media gate way 22 and the third mobile terminal 21 is performed.

The invention claimed is:

1. A method in an application server for supporting a communication established between a mobile terminal and a telecommunications network, the telecommunications network including a first radio access network, a second radio access network, and the application server, the method comprising the steps of:

receiving a different session identifier for each of a plurality of sessions established for the mobile terminal on the first radio access network, the plurality of sessions comprising both active and held sessions;

entering the plurality of session identifiers into an identifier list comprising identifiers for the active and held sessions with respect to the mobile terminal;

receiving an indication regarding handover of the mobile terminal from the first radio access network to the second radio access network; and providing the identifier list to a call-control switching server of the second access network in response to receiving the indication of handover of the mobile terminal, thereby enabling the call-control switching server to transfer to the second access network, the plurality of sessions established for the mobile terminal, including active and held sessions, the plurality of sessions being transferred by the call-control switching server at the same time; and anchoring the plurality of sessions for the mobile terminal by establishing a first access leg to communicate with the mobile terminal over the first radio access network and a second access leg to communicate with the mobile terminal over the second radio access network, wherein the application server receives the session identifiers via the first access leg before the session transfer, and sends the identifier list via the second access leg after the session transfer.

2. The method according to claim 1, wherein the first radio access network is a packet-switched network, and the second radio access network is a circuit-switched network.

3. The method according to claim 2, wherein Session Initiation Protocol (SIP) signaling is used to provide the identifier list to the switching server.

4. The method according to claim 1, wherein the mobile terminal allocates each of the plurality of session identifiers to be provided to the application server when originating each corresponding call.

5. The method according to claim 4, wherein a network node within the telecommunications network allocates each of the plurality of session identifiers and provides the identifiers to the application server and to the mobile terminal when the mobile terminal receives each corresponding call.

6. The method according to claim 5, wherein the session identifiers are each marked as either terminal allocated or network allocated.

7. The method according to claim 1, wherein the list of identifiers also includes at least one of:
an identification of an originating party for each session;
an identification of a terminating party/parties for each session; and
state information of the sessions.

8. The method according to claim 1, wherein the switching server initiates the transfer of the sessions and sends to the application server, the indication regarding the transfer of the sessions.

9. An application server in a telecommunications network for supporting a communication established towards a mobile terminal, the telecommunications network including a first radio access network and a second radio access network, the application server comprising:

a receiver for receiving a different session identifier for each of a plurality of sessions established for the mobile terminal on the first radio access network, the plurality of sessions comprising both active and held sessions, and for subsequently receiving an indication regarding handover of the mobile terminal from the first radio access network to the second radio access network;

a memory for entering the plurality of session identifiers into an identifier list comprising identifiers for all active and held sessions with respect to the mobile terminal; and a message sender for providing the identifier list to a call-control switching server of the second access network in response to receiving the indication of handover of the mobile terminal, thereby enabling the call-control switching server to transfer to the second access network, the plurality of sessions established for the mobile terminal, including active and held sessions, the plurality of sessions being transferred by the call-control switching server at the same time; and anchoring the plurality of sessions for the mobile terminal by establishing a first access leg to communicate with the mobile terminal over the first radio access network and a second access leg to communicate with the mobile terminal over the second radio access network, wherein the application server receives the session identifiers via the first access leg before the session transfer, and sends the identifier list via the second access leg after the session transfer.

10. A non-transitory computer readable medium encoded with computer executable instructions in an application server in a telecommunications network, wherein execution of the computer executable instructions by a processing unit of the application server, causes the application server to perform the steps of:

receiving a different session identifier for each of a plurality of sessions established for the mobile terminal on the first radio access network, the plurality of sessions comprising both active and held sessions;

entering the plurality of session identifiers into an identifier list comprising identifiers for all active and held sessions with respect to the mobile terminal;

receiving an indication regarding handover of the mobile terminal from the first radio access network to the second radio access network; and providing the identifier list to a call-control switching server of the second access network in response to receiving the indication of handover of the mobile terminal, thereby enabling the call-control switching server to transfer to the second access network, the plurality of sessions established for the mobile terminal, including active and held sessions, the plurality of sessions being transferred by the call-control switching server at the same time; and anchoring the plurality of sessions for the mobile terminal by establishing a first access leg to communicate with the mobile terminal over the first radio access network and a second access leg to communicate with the mobile terminal over the second radio access network, wherein the application server receives the session identifiers via the first access leg before the session transfer, and sends the identifier list via the second access leg after the session transfer.

* * * * *